United States Patent Office 3,580,765
Patented May 25, 1971

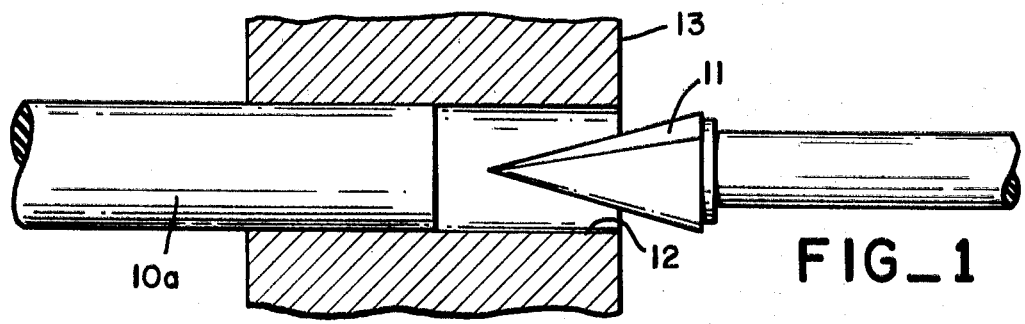
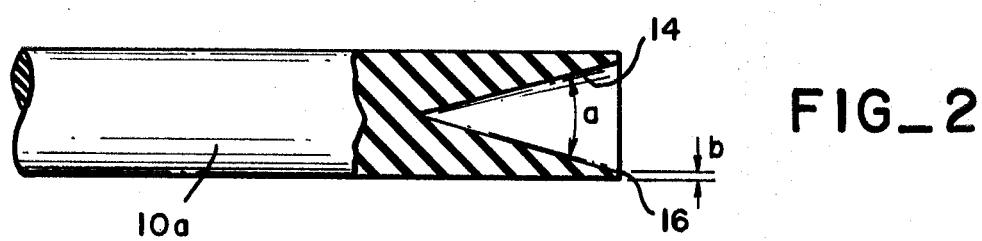
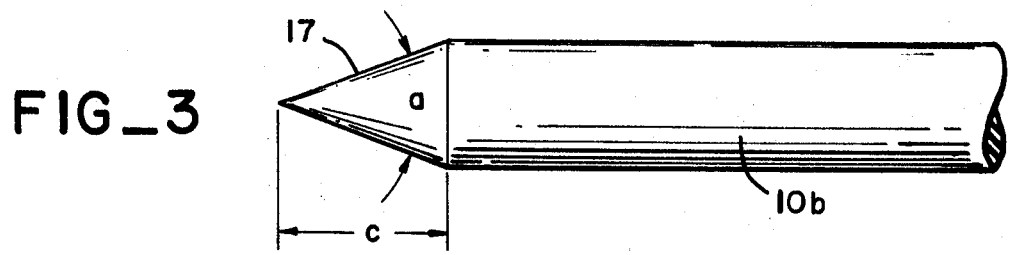
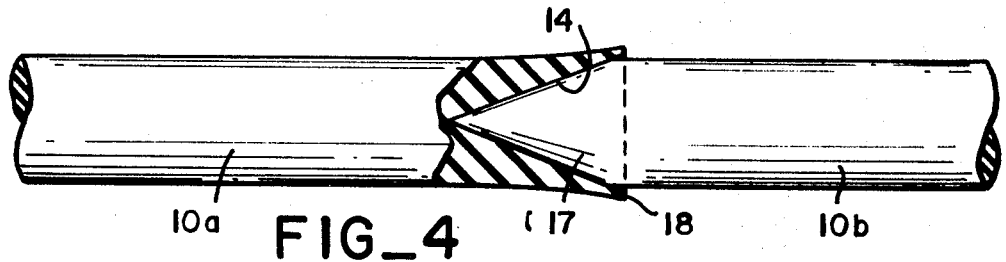
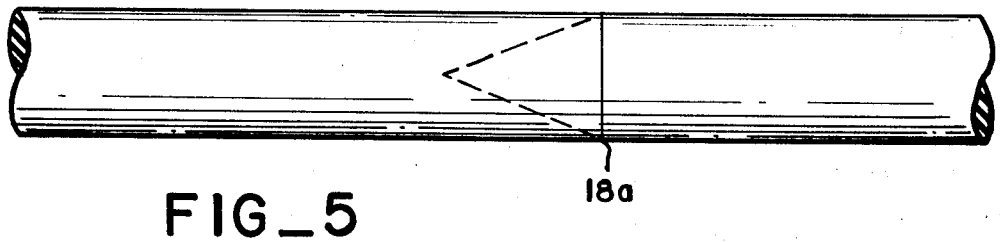
INVENTOR.
MARVIN H. GROVE

3,580,765
RESILIENT O-RING AND METHOD OF
MANUFACTURE
Marvin H. Grove, Houston, Tex., assignor to M & J Valve Company, and M & J Development Company, both of Houston, Tex.
Filed Apr. 21, 1969, Ser. No. 817,651
Int. Cl. B29h 5/02; F16j 9/00
U.S. Cl. 156—110      3 Claims

ABSTRACT OF THE DISCLOSURE

A resilient O-ring characterized by a particular type of junction between the ends of cured resilient stock. A conical cavity is formed in one end of the stock and a conical taper on the other end, the taper being on an included angle greater than that of the cavity. After applying cement the two parts are forced together with radial expansion at the junction. The junction is then trimmed away to the dimensions of the stock.

BACKGROUND OF THE INVENTION

O-rings made of synthetic or natural rubber or other elastomer have met with wide acceptance in various applications, such as for coupling seals, shaft seals and the like. The conventional method for their manufacture involves the use of molds in which resilient stock is cured. This method has a number of disadvantages, including particularly the time-consuming molding operation and the necessity for expensive molds and press equipment. For the larger-sized O-rings, as for example with a diameter of one-quarter inch or more in section, attempts have been made to employ a length of cured extruded stock with the ends being cemented or bonded together. However, it has been found that the usual types of junctions or splicings are unsatisfactory. Particularly, surface fissures tend to be formed which cause points of leakage. Also the junction may lack sufficient strength to remain intact during usage.

SUMMARY OF THE INVENTION AND OBJECTS

This invention relates generally to the construction of resilient O-rings and to methods for their manufacture.

It is an object of the invention to provide a novel O-ring construction characterized by the use of a particular kind of junction between the ends of cured rubber stock. The junction is such that an exterior part of the resilient material is in circumferential tension.

Another object of the invention is to provide a simple method for the manufacture of resilient O-rings which eliminates the use of conventional molding or clamping devices and makes possible the production of junctions to high accuracy and without the presence of fissures tending to cause leakage.

Additional objects and features of the invention will appear from the following description in which the preferred embodiments have been set forth in detail in conjunction with the accompanying drawing.

BRIEF DESCRIPTION OF THE DRAWING

FIG. 1 is a plan view schematically illustrating how a conical cavity is formed in one end of the resilient stock;

FIG. 2 is a plan view partly in section showing one end of the resilient stock after forming the conical cavity;

FIG. 3 is a plan view showing how the other end of the resilient stock is shaped;

FIG. 4 is a plan view partly in section illustrating how the two ends are forced together after cement has been applied; and FIG. 5 is a plan view illustrating the complete junction between the end portions of the stock after excess material has been trimmed away.

DESCRIPTION OF THE PREFERRED EMBODIMENT

To carry out the present method I employ cured resilient stock which is relatively accurate in its dimensions. Such stock can be purchased in a wide variety of resilient materials and is generally manufactured by a process of extrusion. The hardness of the stock may vary depending upon the service intended, but may for example range from 60 to 90 durometer (A scale).

The first step is to cut off a length of the stock sufficient to form a complete O-ring. A clean cut should be made with a simple cutting blade so that the end faces are perpendicular to the axis. FIG. 1 illustrates how a conical recess is formed in the one end portion 10a of the stock. A conical shaped cutter 11 is provided which is driven at a suitable speed. It is disposed in alignment with the bore 12 formed in the guide 13. The rubber stock 10a is fitted snugly within the bore 12 and its end urged against the cutter 11 by simple manual force. The conical cavity formed in this manner is shown in FIG. 2. Preferably the depth of the cavity is greater than the diameter of the stock. The depth of the cavity is limited to leave an annular end surface 16.

The included angle $a$ of the cavity should be less than 45°, and in practice can be of the order of 30°. With respect to the dimension $b$, care should be taken to avoid producing an edge of feather thinness. In other words, it is desirable to limit the depth of the cavity whereby the edge $b$ is of substantial radial width, although it may be less than about one-quarter the diameter of the stock.

The other end portion 10b of the rubber stock is formed to provide the tapered conical-shaped end 17. This is formed on an included angle which is somewhat greater than the included angle of the cavity 14. For example, assuming that the cavity is formed with an included angle $a$ of 30°, the tapered portion 17 can be formed on an included angle $a$ of about 40°. The length $c$ of portion 17 is likewise somewhat greater than the diameter of the rubber stock, although it is less than the depth of the cavity 14.

After the two end portions have been provided with a cavity and a tapered end as described above, suitable cement is applied to the surfaces, and the two parts are then forced together in the manner shown in FIG. 4. This can be carried out manually without the use of molds or clamps. The forcing of the two parts together serves to stretch and tension the portion 18 so that this portion extends to a diameter considerably greater than the remainder of the stock. However, the distorted cavity is filled by the end 17. The two parts are then held as shown in FIG. 4 for a short period of time until the cement has set. Thereafter the material at the junction is trimmed away to the diameter of the stock, thus leaving a junction such as shown in FIG. 5. This trimming can be carried out by a simple grinding device to which the junction is applied manually.

In the finished junction it will be apparent that the portion 18a remains in tension and this characteristic, together with the manner in which the junction is formed, prevents the formation of any surface fissures such as might tend to cause leakage.

The cement employed should be selected to be compatible with the type of resilient material used, for example, with synthetic rubbers I have secured good results by employing an adhesive known as Eastman 910 Adhesive, manufactured by Armstrong Cork Company. This adhesive is stated to contain methyl-2-cyanoacrylate.

The cutter 11 employed can be a simple double-edged conical cutter driven at a suitable speed and capable of forming a clean cut without ragged edges.

The device used for making a conical shaped end as shown in FIG. 3 can be a simple grinder provided with guide means and functioning similar to a pencil sharpener.

I claim:

1. A resilient O-ring formed of cured resilient stock, the stock having a junction comprising a conical shaped end having an included angle of about 40° cemented within a conical shaped recess, the material surrounding the junction being in circumferential tension, the amount of tension being substantially that obtained when the conical shaped recess is expanded from an included angle of 30° to an included angle of about 40°.

2. A method for the manufacture of resilient O-rings from a length of cured resilient stock of the desired cross-sectional dimensions, forming a conical cavity in one end of the stock, the axis of the cavity being coincident with that of the stock, forming a conical tapered end on the other end portion of the stock, the included angle of the tapered end portion being greater than the included angle of the cavity, applying bonding adhesive, forcing the tapered end into the cavity with radial expansion of material surrounding the cavity, and then after setting of the adhesive trimming off material to reduce the diameter of the junction to that of the stock.

3. A method as in claim 2 in which the depth of the cavity is greater than the length of the tapered end.

References Cited

FOREIGN PATENTS 476,019   11/1937   Great Britain _____ 277—221

LAVERNE D. GEIGER, Primary Examiner

U.S. Cl. X.R.

156—160, 229, 258, 266, 267; 277—222